April 2, 1957 N. S. SHATALOFF ET AL 2,787,288
FLOW CONTROL DEVICES
Filed Sept. 2, 1953 2 Sheets-Sheet 1
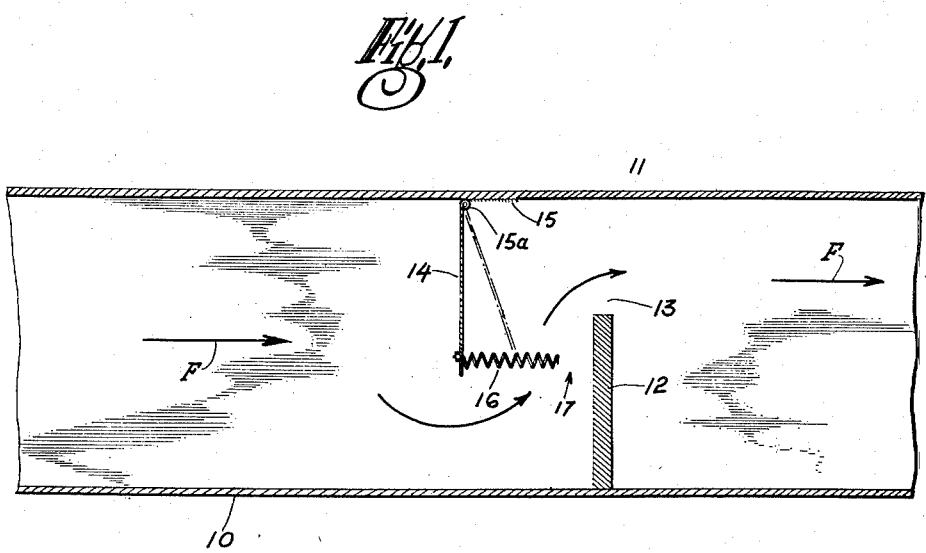
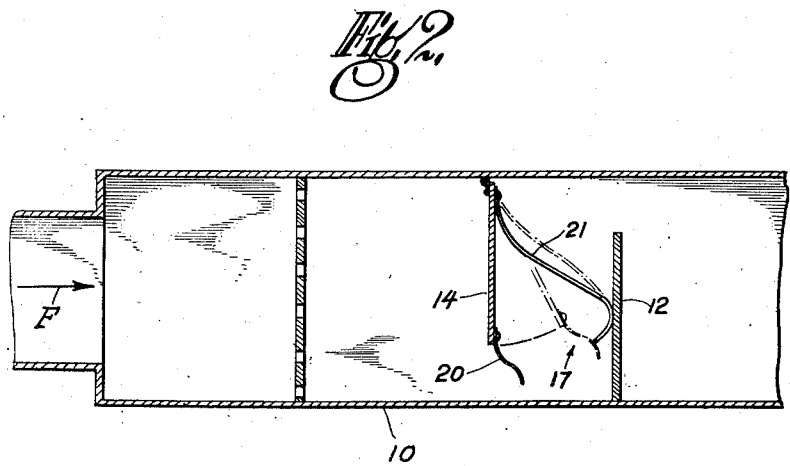
INVENTOR.
NICHOLAS S. SHATALOFF
ERNEST A. WERDER
BY
Pollard, Johnston, Smythe & Robertson
ATTORNEYS

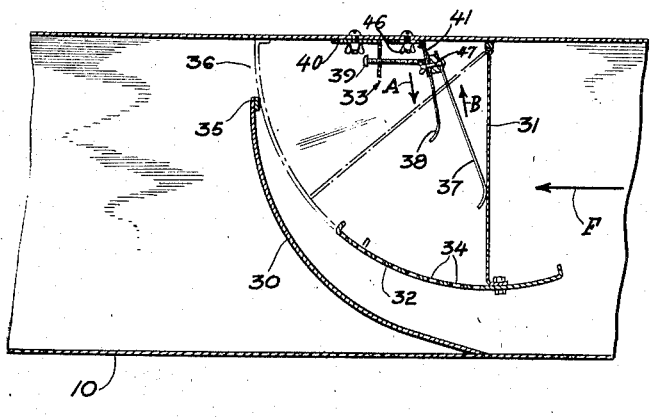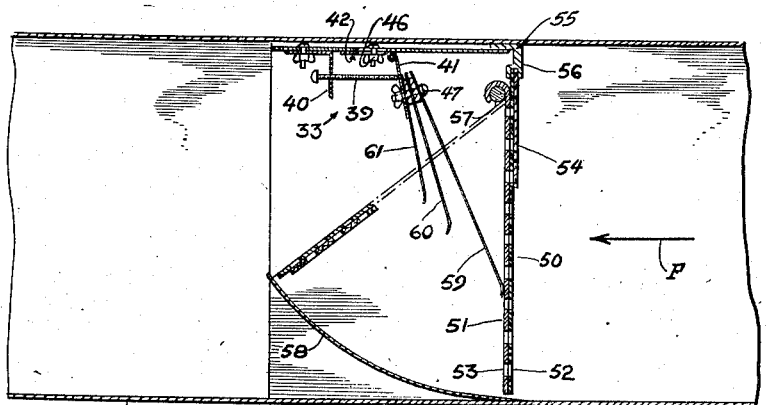

United States Patent Office 2,787,288  
Patented Apr. 2, 1957

2,787,288

FLOW CONTROL DEVICES

Nicholas S. Shataloff, New York, and Ernest A. Werder, Rego Park, N. Y., assignors to Buensod-Stacey, Incorporated, New York, N. Y., a corporation of Delaware Application September 2, 1953, Serial No. 378,086

5 Claims. (Cl. 138—46)

This invention relates generally to flow control devices. It provides improvements of particular importance for use with air conditioning systems which deliver large volumes of air from central conditioning apparatus to a plurality of individual distributing units.

It is a well-known principle of dynamics that variations of fluid pressure in a fluid distribution line result in an inconstant rate of flow. In air conditioning systems, particularly those of the aforementioned type, pressure variations in air delivery lines are frequent because of the irregular and changing air demands in the individual rooms conditioned, and it is known that a changing rate of air delivery in such systems is a contributing cause to the objectionable audible noises that commonly accompany the operation of known air distributing units.

A number of types and constructions of flow control devices are known which embody the concept of controlling the size of an orifice in response to pressure in the fluid line. However, a need still exists in the art for a satisfactory self-contained flow control device using no outside source of power of low cost that will reliably maintain a substantially constant rate of fluid flow in fluid lines, such as supply ducts for air conditioning systems, delivering large volumes of fluid under frequently varying pressures, and it is the principal object of this invention to provide such a device.

Another object of the invention is to provide a constant or nearly constant volumetric delivery flow control device in which the volumetric rate of flow may be set at any value within an appreciable range.

These and other objects, features and advantages will become apparent from the following description of the accompanying drawings which are merely exemplary.

In the drawings:

Figure 1 is a vertical longitudinal section through a duct having a flow control device according to my invention;

Figure 2 is a vertical longitudinal section through a duct having a modified form of control;

Figure 3 is a vertical longitudinal section of another modified form of control device embodying features of this invention;

Figure 4 is a perspective view of parts of the control device shown in Figure 3;

Figure 5 is a longitudinal vertical section of still another form of this invention.

The invention may be applied to fluid distributing ducts through which either liquids or gasses flow; however, the flow control devices illustrated are adapted particularly for air distributing ducts of the type used in known air conditioning systems. These ducts are indicated at 10 and air flow is in the direction indicated by arrows F.

One form which the invention may take is shown in Figure 1, in which the flow control device, designated generally at 11, includes a stationary baffle 12 that extends transversely across the width of the duct and upwardly from the bottom of the duct partly across the height of the duct so that an open passage 13 is formed above the baffle.

A movable baffle plate 14 is suspended from the top of the duct by a hinge 15 for swinging movement about the fixed hinge axis 15a towards and away from baffle 12. Baffle plate 14 is disposed on the upstream side of stationary baffle 12 in spaced relation thereto, and extends transversely across the width of the duct and inwardly to points beyond the upper end of baffle 12 so that a restricted passageway 17, through which flow passes, is formed between the stationary and movable baffle. The passageway is variable in size, the size depending on the position of baffle 14 relative to baffle 12. One or more normally unstressed springs 16, which are rigidly fastened at one end to plate 14 and are free at the other end, extend axially away from such plate towards stationary baffle 12, the latter lying in the path of movement of the free end of the springs so that the springs will strike the baffle as plate 14 swings towards fixed baffle 12 under increases in the pressure head of the flow. The springs will be stressed proportionally to such pressure head acting against the forward face of plate 14.

Baffle plate 14 normally hangs vertically in a position in which passageway 17 is fully open. As flow increases, the pressure head acting on plate 14 rises, tending to swing plate 14 about hinge axis 15a and towards baffle 12 so as to close passageway 17. Springs 16 become stressed and limit movement of plate 14 so that the passageway 17 closes to a degree which offsets the increased flow, thereby automatically maintaining a constant volumetric rate of delivery at all times, regardless of pressure variations in the duct. It will be seen that spring 16 not only limits movement of baffle 14 in accordance with the pressure on the baffle but it also prevents total closure of the flow control device. Thus, the device is safeguarded against sticking or locking in a closed position, for it will never close completely, even under excessive pressures, and will always remain open to allow some air flow.

The embodiment shown in Figure 2 is similar to that shown in Figure 1, except for the spring arrangement. In Figure 2, contrary to Figure 1, a double spring arrangement is used which permits two-stage control. A relatively flexible leaf spring 21 is operative within a wide range of lower pressures to modulate the deflection of plate 14 as the plate moves toward the fixed baffle 12. At the upper limit of the low pressure range, a less flexible spring 20 abuts stationary abutment 12 or spring 21 and becomes operative within a range of higher pressures to regulate further movement of baffle plate 14. This embodiment permits accurate constant volume control over a wide range of operation.

Figure 3 shows another fluid control device in which a stationary baffle 30, a movable baffle 31 and a spring member 33 are arranged in an air distributing duct 10 to maintain a constant volumetric flow through the duct. This embodiment is also a two-stage device. Movable baffle plate 31 is pivoted at its upper end to the top wall of the duct and hangs freely therefrom, its lower free end carrying a shoe 32 spaced from the bottom of the duct so as to permit flow under the baffle and shoe. Stationary baffle 30 extends forwardly in the direction of flow from points underlying the shoe and curves inwardly from the bottom of the duct in a manner to reduce gradually the spacing between the stationary baffle and the path of movement of shoe 32, the inner edge of baffle 30 being inwardly spaced from the top wall of the duct 10 and having a felt tip 35 tangent to such path of movement. Shoe 32 is attached to the lower end of the baffle 31 at such an angle that as the baffle 31 approaches and reaches its limiting angular position, shoe 32 will span the spacing between the inner edge of baffle 30 and the top wall of the duct. The leg of the shoe 32 that spans such spacing is perforated at 34 and has a greater breadth than such spacing so that as the shoe spans the spacing, a limited continued flow is always permitted. It will be understood that air normally passes under baffle 31 and then over baffle 30. When flow increases, the resulting increased thrust exerted on baffle 31 tends to swing it in a downstream direction, decreasing the spacing between baffle 30 and shoe 32. It will be noted that this spacing gradually decreases as the baffle 31 is progressively deflected from its normal vertical position by an increasing pressure head in the duct until shoe 32 brushes the trailing felt tip 35 of stationary baffle 30. This may be considered the low pressure stage of operation.

After the space between the stationary and movable baffles is closed, air continues to flow through perforations 34 and through the space 36 above the fixed baffle 30. Flow through passage 36 is then throttled as the shoe 32 spans the space between the trailing tip 35 of baffle 30 and the top wall of the duct when baffle 31 is further deflected by higher pressures. It is to be noted that some air will always flow through the control device, for a limited amount of air will continue to pass through perforations 34 in that portion of the shoe spanning passageway 36.

Movement of baffle plate 31 is limited by an adjustable spring member 33, which is stressed proportionally to the pressure head acting on the upstream face of plate 31 so as to maintain a constant rate of flow. In this embodiment the spring may take the form of a double leaf spring having a primary flexible blade 37 and a secondary, less flexible blade 38 suspended in a position to be stressed consecutively by a baffle plate 31 as the latter is deflected in a downstream direction.

In order to vary the rate of air flow in an air distributing system utilizing the control device of Figure 3, the spring arrangement 33 has several adjustments, any one or more of which may be made to effect a desired flow rate. A set screw 39 threadedly received in bracket 40 bears against the freely hanging leg 41 of the hinge 42 that supports spring blades 37 and 38. By manipulating set screw 39, the angle between the legs of the hinge can be varied; displacing leg 41 to the right, as viewed in Figure 3, increases the angle and displaces springs 37 and 38 and baffle 31 to the right, thereby increasing the force necessary to overbalance the springs for moving baffle plate 31 in a direction to reduce the size of the restricted passageway. It will be seen, therefore, that increasing the angle setting increases the flow rate, for the opening between the baffles will be correspondingly larger than the previous angle setting under the same pressure head conditions. Movement of set screw 39 to the left, as viewed in Figure 3, will reset springs 37 and 38.

The springs 37 and 38 may also be reset by adjustment of hinge 42 axially in the duct or by lateral adjustment of the springs 37 and 38 relative to spring supporting leg 41 of hinge 42. For these purposes, slots 44 and 45 are provided in legs 41 and 43, respectively, of hinge 42; slot 45 receives a machine screw 46 by which it is adjustably fastened to the top wall of the duct, and slot 44 receives machine screws 47 which also extend through the blades 37 and 38 and blade-spacers to hold the latter elements in assembled relation on hinge leg 41. Moving spring blades 37 and 38 in upstream and downstream directions by longitudinal displacement of hinge 42 respectively increases and decreases the rate of flow in a manner similar to the described adjustment of the springs by set screw 39. Displacement of blades 37 and 38 in a downward direction relative to hinge leg 41, as indicated by arrow A, advances the position of angular displacement of baffle 31 at which the springs apply a counter force to the thrust of the pressure head acting on such baffle 31 so as to increase the rate of air flow. Upward displacement of the spring blades in the direction of arrow B effects a decrease in the rate of flow by retarding the position of angular displacement at which the springs apply such counter force.

Another feature of this invention more particularly shown in Figure 4 includes plates 50 and 51 mounted to extend across duct 10 with their adjacent faces in abutting relation; plate 50 preferably is made of rigid material such as metal and has perforations 52 and plate 51 preferably is made of a suitable fluid-pervious substance such as a solid fabric and has perforations 53. A solid fabric baffle 54 may be used on the upstream side of plate 50 to limit the number of open perforations 52. Plate 50 and baffle 54 may be suspended from a fixed bracket 55, a Y-shaped arm 56 of the bracket fitting over the top of the plate and baffle. The latter members may be frictionally or otherwise held by the arm. The metal plate 51 is formed with a hook at its upper end which hangs over a fixed horizontally extending pin 57 and swings freely thereon. It will be observed that plates 50 and 51 normally hang in a vertical position, and the apertures 52 and 53 are arranged to be aligned in this position. This is the low pressure position. When pressure in the duct increases, the plates 50 and 51 will swing in a downstream direction and will slide laterally relative to one another, the apertures gradually being moved out of alignment until apertures 53 are eventually covered by solid portions of fabric plate 50. Because the plate that obstructs apertures 53 is made of fabric or other suitable pervious material, some air will continue to flow through apertures 53 at all times. An arcuate baffle 58 having a radius of curvature substantially the same as the path described by the lower tip of plate 51, is positioned to block the spacing between such lower tip and the bottom of the duct as the tip moves under the influence of air pressure out of its normal position in a downstream direction.

Movement of plates 50 and 51 is regulated by a spring arrangement 33 constructed and operative in the same manner as the spring arrangement shown in Figure 3. The number of leaf-springs or blades may be varied, depending upon the range of operation of the unit. For example, Figure 4 shows a three-stage spring arrangement which employs three blades 59, 60 and 61 of decreasing flexibility in the order given, so that each spring will be operative over a predetermined range to regulate accurately the position of the plates in accordance with the pressure acting against the upstream face of plate 50 for maintaining a substantially constant rate of flow regardless of the pressure in the duct.

It should be apparent that various details of construction can be changed without departing from the spirit of the invention as defined in the appended claims.

What is claimed is:

1. A device for controlling fluid flow through a duct comprising at least two members extending across the duct and together defining a passageway of variable cross section for the passage of fluid therethrough, one of said members normally lying transversely to the path of flow to the fluid and being movable relative to the other member in a direction to reduce the size of said passageway in response to the pressure head of fluid flowing through the duct, resilient means including a plurality of springs positioned to be stressed consecutively by the movable member as it is moved in the direction to reduce the size of said passageway so as to apply a force to said movable member opposing the action of fluid pressure head, said springs being progressively less flexible in the order in which they are stressed.

2. A device for controlling fluid flow through a duct comprising two plate members extending across the path of flow of fluid and having adjacent faces in abutting relation, each of said plate members having a plurality of apertures therein arranged so as normally to be aligned to define a restricted passageway for the flow of fluid therethrough, separate means mounting each of said plate members for swinging movement in response to the pressure head in the duct from a normal position in which the apertures of the plate members are aligned to a limiting relative lateral position in which said apertures are out of alignment, baffle means positioned to close the spacing between the plate members and opposing wall portions of the duct as the baffle swings from its normal position, and yieldable spring means limiting swinging movement of said plate members in accordance with the fluid pressure head in the duct.

3. A device for controlling fluid flow through a duct comprising two plate members extending across the path of fluid and having adjacent faces in abutting relation, each of said plate members having a plurality of apertures therein arranged so as normally to be aligned to define a restricted passageway for the flow of fluid therethrough, separate means mounting each of said plate members for swinging movement in response to the pressure head in the duct from a normal position in which the apertures of the plate members are aligned to a limiting relative lateral position in which said apertures are out of alignment, baffle means positioned to close the spacing between the plate members and opposing wall portions of the duct as the baffle swings from its normal position, other baffle means arranged to lie on the upstream side of said plate members for swinging movement therewith and to block a predetermined number of apertures so as to limit the size of said passageway, and yieldable spring means limiting swinging movement of said plate members in accordance with the fluid pressure head in the duct.

4. A device for controlling fluid flow through a duct comprising two plate members extending across the path of flow and each having a plurality of apertures therein arranged so as normally to be aligned with the apertures in the other plate member, said plate members having adjacent faces in abutting relation and being mounted at one end to swing freely about fixed parallel offset axes in response to the pressure head of the fluid in the duct so that as the plates swing about such axes they slide laterally relative to each other and gradually move the apertures of said plate members out of alignment, and stationary baffle means positioned to close the spacing between the free end of said plate members and opposing wall portions of the duct.

5. A device for controlling fluid flow through a duct comprising two plate members hanging vertically across the path of flow of fluid, one of said plate members being of rigid material and having a plurality of apertures therein, the other plate member being of a pervious material disposed on the upstream side of said rigid member and having a plurality of apertures arranged to register the apertures in the other plate member in their normal vertical position, said plate members having adjacent faces in abutting relation and being mounted at their upper ends to swing freely about fixed parallel offset axes in response to the pressure head of the fluid in the duct so as the plates swing about said axes they slide laterally relative to each other and gradually move the apertures of said plate members out of registry, stationary baffle means underlying the path of movement of said plate members to close the spacing between said plate members and the bottom of the duct, and yieldable spring means limiting swinging movement of said plate members in proportion to the fluid pressure head in the duct.

References Cited in the file of this patent
UNITED STATES PATENTS

| | | |
|---|---|---|
| 1,397,739 | Moyer | Nov. 22, 1921 |
| 1,707,912 | Heindorf | Apr. 2, 1929 |
| 1,874,083 | Clay | Aug. 30, 1932 |
| 2,250,614 | Willer | July 29, 1941 |
| 2,402,729 | Buchanan | June 25, 1946 |